(12) United States Patent
Ren et al.

(10) Patent No.: US 9,021,908 B2
(45) Date of Patent: May 5, 2015

(54) HYDRAULIC SYSTEM, DRIVING SYSTEM AND ELECTRIC VEHICLE

(71) Applicants: Shenzhen BYD Auto R&D Company Limited, Guandong (CN); BYD Company Limited, Shenzhen, Guangdong (CN)

(72) Inventors: Yi Ren, Guangdong (CN); Shenglin Yang, Guangdong (CN); Jun Li, Guangdong (CN)

(73) Assignees: Shenzhen BYD Auto R&D Company Limited, Shenzhen, Guangdong (CN); BYD Company Limited, Shenzhen, Guangdong (CN)

( * ) Notice: Subject to any disclaimer, the term of this patent is extended or adjusted under 35 U.S.C. 154(b) by 194 days.

(21) Appl. No.: 13/726,985

(22) Filed: Dec. 26, 2012

(65) Prior Publication Data
US 2013/0180358 A1 Jul. 18, 2013

(30) Foreign Application Priority Data
Dec. 30, 2011 (CN) ...................... 2011 2 0563819 U

(51) Int. Cl.
F16H 48/00 (2012.01)
F16H 47/02 (2006.01)
F04B 23/00 (2006.01)
F16D 48/02 (2006.01)

(52) U.S. Cl.
CPC ........ *F16H 47/02* (2013.01); *F16D 2048/0236* (2013.01); *F16D 48/0206* (2013.01); *F16D 2048/0248* (2013.01); *F16D 2048/0281* (2013.01); *F16D 2048/0293* (2013.01); *F04B 23/00* (2013.01)

(58) Field of Classification Search
USPC ......................................... 74/325, 335, 732.1
See application file for complete search history.

(56) References Cited

U.S. PATENT DOCUMENTS

| | | | | |
|---|---|---|---|---|
| 4,043,122 A | * | 8/1977 | Graham | .......................... 60/375 |
| 6,931,846 B1 | * | 8/2005 | Trinkel, Jr. | ...................... 60/419 |
| 7,409,826 B2 | * | 8/2008 | Epshteyn | ......................... 60/414 |
| 7,707,911 B2 | * | 5/2010 | Grethel et al. | ............... 74/730.1 |
| 2009/0321209 A1 | * | 12/2009 | Grethel et al. | ............. 192/70.12 |

* cited by examiner

*Primary Examiner* — Ha D Ho
(74) *Attorney, Agent, or Firm* — Finnegan, Henderson, Farabow, Garrett & Dunner, LLP

(57) ABSTRACT

A hydraulic system of an electric vehicle may comprise: an oil container; a first and a second clutch driving circuits connected in parallel; an internal pump driven by a driving system of the electric vehicle; a first check valve connected in series at an outlet side of the internal pump; an external pump driven by an external pump motor; and a second check valve connected in series at an outlet side of the external pump. The first check valve and the internal pump connected in series and the second check valve and the external pump connected in series are connected in parallel between the oil container and the first and second clutch driving circuits.

18 Claims, 4 Drawing Sheets

HYDRAULIC SYSTEM, DRIVING SYSTEM AND ELECTRIC VEHICLE

CROSS-REFERENCE TO RELATED APPLICATION

The present application claims priority to and benefits of Chinese Patent Application No. 201120563819.0 filed with State Intellectual Property Office of the P.R. China on Dec. 30, 2011, the entire contents of which are incorporated herein by reference.

FIELD

The present disclosure relates to automobiles, more particularly, to a hydraulic system, a driving system of an electric vehicle.

BACKGROUND

Due to increases in fuel price and the environmental pollution caused by conventional petrol vehicles, electric vehicles have attracted more and more attention. A power battery is used as a power source of an electric vehicle, and the electric vehicle is driven by an electric motor, thus avoiding limitation of an engine and reducing pollution.

Conventionally, the electric vehicle may be driven by a driving motor and a reducer with a constant transmission ratio. The driving motor has a high output torque and a low efficiency at a low rotational speed. With the increasing of the rotational speed of the driving motor, the efficiency is increased gradually, but the output torque is much lower. With the electric vehicle including the reducer with a constant transmission ratio, for the reducer with a high torque, the efficiency is increased slowly with the increasing of the rotational speed of the driving motor, and consequently the power consumption of the vehicle is quite large at a high speed; and for the reducer with a high rotational speed, the efficiency is increased quickly with the increasing of the rotational speed of the driving motor. However, due to the low transmission ratio of the reducer, the torque transmitted to the wheels is too low to satisfy the requirement of the vehicle when it is starting or climbing. As a result, the power consumption of the vehicle is quite large at a low rotational speed. For example, the electric bus may need frequent parking, starting or acceleration, which may cause the low efficiency of the driving motor. Therefore, the driving system of the conventional electric vehicle is difficult to meet the work conditions for low speed and high speed simultaneously, thus the driving motor has a low efficiency, which may shorten the driving range of the electric vehicle if the power storage of the battery is not changed. As a result, the conventional electric vehicle may not be applied to complicated driving conditions.

SUMMARY

The present disclosure is directed to solve at least one of the problems existing in the prior art. Accordingly, a hydraulic system of an electric vehicle is provided, which may match the torque and rotational speed characteristics of the driving motor appropriately to improve efficiencies of the driving motor under different driving mode or running conditions. Further, a driving system and an electric vehicle comprising the same may also need to be provided.

According to an aspect of the present disclosure, a hydraulic system for a vehicle is provided. The hydraulic system may comprise: an oil container; a first and a second clutch driving circuits connected in parallel; an internal pump with an inlet in fluid communication with the oil container and an outlet in fluid communication with the first and second clutch driving circuits respectively; a first check valve connected in series with the internal pump; an external pump, with an inlet in fluid communication with the oil container and an outlet of the external pump in fluid communication with the first and second clutch driving circuits; and a second check valve connected in series with the external pump, wherein the first check valve and the internal pump are connected in parallel with the second check valve and the external pump between the oil container and the first and second clutch driving circuits.

According to another aspect of the present disclosure, a driving system of an electric vehicle may be provided. And the driving system may comprise: a driving motor; a transmission having: an input shaft, a countershaft, an output shaft, a first transmission unit, a first clutch, a second transmission unit, a second clutch and a hydraulic system as described above. The driving motor may be connected to the input shaft, the input shaft may be connected to the countershaft to supply power from the driving motor to the countershaft. The first transmission unit may be connected between the countershaft and the output shaft to transmit power between the countershaft and the output shaft. The second transmission unit may be connected between the countershaft and the output shaft to transmit power between the countershaft and the output shaft. The first clutch may be disposed on the countershaft and connected with the first transmission unit for linking or cutting off the power transmission between the countershaft and the first transmission unit. The second clutch may be disposed on the countershaft and connected with the second transmission unit for linking or cutting off the power transmission between the countershaft and the second transmission unit, and the first transmission ratio of the first transmission unit may be larger than the second transmission ratio of the second transmission unit. And the internal pump may be driven by the countershaft, and the first clutch driving circuit may be connected with the first clutch to engage or disengage the first clutch. The second clutch driving circuit may be connected with the second clutch to drive the second clutch to engage or disengage the second clutch.

According to still another aspect of the present disclosure, an electric vehicle may be provided. The electric vehicle may comprise a driving system as described above.

According to a hydraulic system, a driving system and an electric vehicle of the present disclosure, a torque and rotating speed characteristics of the driving motor may be appropriately matched with each other, thus efficiencies of the driving motor under different driving conditions may be effectively improved.

Additional aspects and advantages of the embodiments of the present disclosure will be given. In part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION

Figure 1:
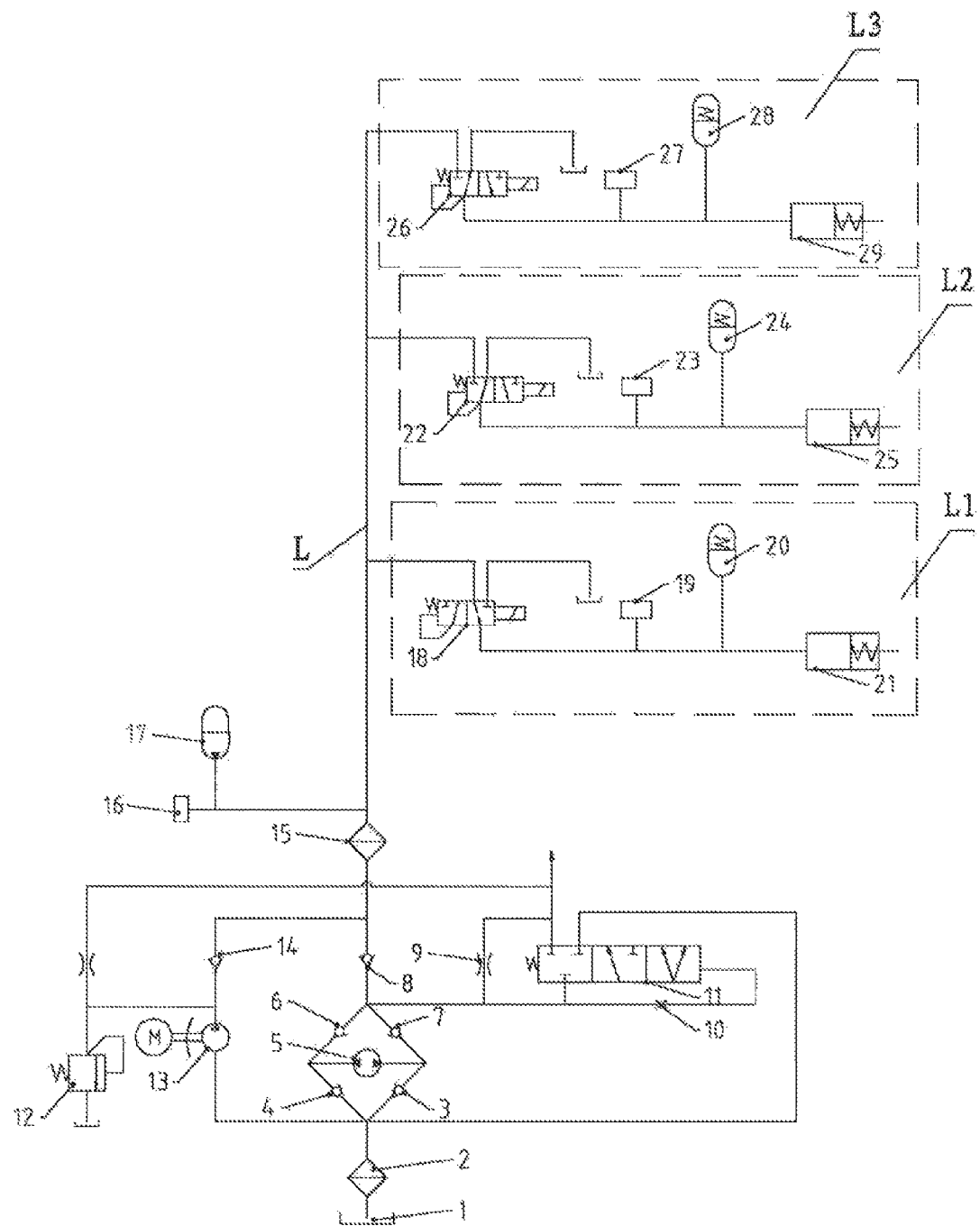
FIG. 1 is a schematic diagram illustrating a hydraulic system of an electric vehicle according to an embodiment of the present disclosure.

Reference will be made in detail to embodiments of the present disclosure. The embodiments described herein with reference to drawings are explanatory, illustrative, and used to generally understand the present disclosure. The embodiments shall not he construed to limit the present disclosure. The same or similar elements and the elements having same or similar functions are denoted by like reference numerals throughout the descriptions.

In the description, it should he understood that, relative terms "central", "longitudinal", "transversal", "upper", "lower", "front", "back", "left", "right", "vertical", "horizontal", "top", "bottom" "inner", "external", etc., should be construed to refer to the orientation as described or as shown in the drawings under discussion. These relative terms are for convenience of description and do not require that the present disclosure he constructed or operated in a particular orientation.

In addition, the terms "first" and "second" are only used for description and cannot he construed to explicitly or implicitly refer to the relative importance or implicitly indicate the quality of technical features. Thus, the features defined by "first" and "second" may explicitly or implicitly comprise one or more features. In the description, unless otherwise indicated, the term "a plurality of" means two or more.

In the description as described hereinafter, it should be understood that, terms concerning attachments, coupling and the like, such as "connected" and "interconnected," refer to a relationship in which structures are secured or attached to one another either directly or indirectly through intervening structures, as well as both movable or rigid attachments or relationships, unless expressly described otherwise.

A hydraulic system of an electric vehicle according to embodiments of the present disclosure will he described with reference to FIGS. 1-3.

As shown in FIG. 1, the hydraulic system may comprise an oil container 1, a first clutch driving circuit L1, a second clutch driving circuit L2, a third clutch driving circuit L3, an internal pump 5, a first check valve 8 connected in series at an outlet side of the internal pump 5, an external pump 13, and a second check valve 14 connected in series at an outlet side of the external pump 13.

It may he understood that, in some embodiments, when a transmission comprises only two transmission units, the third clutch driving circuit L3 may not be needed. And when there are more than three transmission units, the number of the clutch driving circuits may be increased correspondingly.

As shown in FIG. 1, in some embodiments, the first clutch driving circuit L1, the second clutch driving circuit L2, and the third clutch driving circuit L3 may be connected in parallel.

According to an embodiment of the present disclosure, as shown in FIG. 1, the first clutch driving circuit L1 comprises a first driving cylinder 21 and a first proportional valve 18. For example, the first proportional valve 18 may be a two-position three-way solenoid valve. According to an embodiment of the present disclosure, the first clutch driving circuit L1 may further comprise a first buffer 20 connected between the first proportional valve 18 and the first driving hydraulic cylinder 21. Alternatively, a first oil pressure sensor 19 for detecting an oil pressure of the first clutch driving circuit L1 may be provided between the first buffer 20 and the first proportional valve 18.

Similarly, the second clutch driving circuit L2 may comprise a second driving hydraulic cylinder 25 and a second proportional valve 22. A second buffer 24 may be connected between the second proportional valve 22 and the second driving hydraulic cylinder 25. A second oil pressure sensor 23 for detecting an oil pressure of the second clutch driving circuit L2 may be provided between the second buffer 24 and the second proportional valve 22.

The third clutch driving circuit L3 may comprise a third driving hydraulic cylinder 29 and a third proportional valve 26. A third buffer 28 may be provided between the third proportional valve 26 and the third driving hydraulic cylinder 29. A third oil pressure sensor 27 for detecting an oil pressure of the third clutch driving circuit L3 may be provided between the third buffer 28 and the third proportional valve 26.

Figure 3:
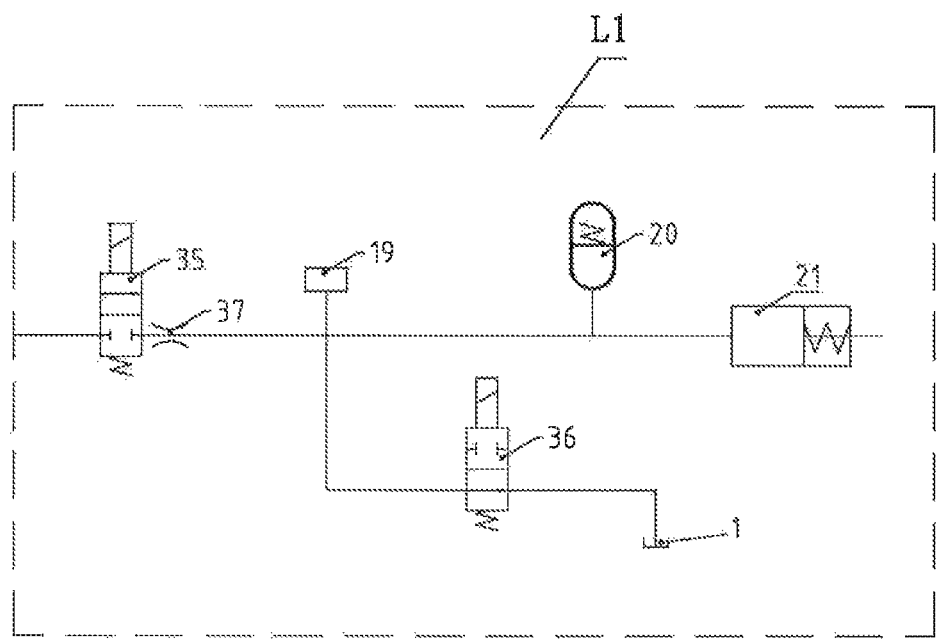
FIG. 3 is a schematic diagram illustrating a first clutch driving circuit of a hydraulic system according to an embodiment of the present disclosure.

According to another embodiment of the present disclosure, as shown in FIG. 3, the first clutch driving circuit L1 may comprise a first driving cylinder 21, a second switch valve 35 and a third switch valve 36. The first driving cylinder 21 may be connected with the second filter 15 via the second switch valve 35, and the first driving cylinder 21 may be connected with the oil container 1 via the third switch valve 36. A piston of the first driving cylinder 21 may be connected with a driving part of the first clutch 55, which will be described hereinafter, to engage or disengage the first clutch 55. According to an embodiment of the present disclosure, the first clutch driving circuit L1 may further comprise a first buffer 20 connected to an oil inlet of the first driving cylinder 21. Alternatively, a first oil pressure sensor 19 for detecting an oil pressure of the first clutch driving circuit L1 may be provided between the first buffer 20 and the second switch valve 35. According to an embodiment of the present disclosure, to regulate the oil pressure of the first clutch driving circuit L1, a third damping orifice 37 may be provided at the first clutch driving circuit L1.

FIG. 3 exemplarily illustrates the first clutch driving circuit L1. The other clutch driving circuits, such as the second clutch driving circuit L2 and the third clutch driving circuit L3, may have similar circuit layout as that of the first clutch driving circuit L1.

To be specific, the second clutch driving circuit L2 may comprise a second driving hydraulic cylinder, a fourth switch valve and a fifth switch valve. The second driving hydraulic cylinder may be connected with the second filter via the fourth switch valve. And the second driving hydraulic cylinder may be connected with the oil container via the fifth switch valve. The second driving hydraulic cylinder may have a piston connected with a driving part of the second clutch.

The third clutch driving circuit L3 may comprise a third driving hydraulic cylinder, a sixth switch valve and a seventh switch valve. The third driving hydraulic cylinder may be connected with the second filter via the sixth switch valve. And the third driving hydraulic cylinder may be connected with the oil container via the seventh switch valve. The third driving hydraulic cylinder may have a piston connected with a driving part of the third clutch.

As shown FIG. 1, the first proportional valve 18 may be connected with the first driving cylinder 21 and the oil container 1 respectively, the second proportional valve 22 may be connected with the second driving cylinder 25 and the oil container 1 respectively, and the third proportional valve 26 may be connected with the third driving cylinder 29 and the oil container 1 respectively. The piston of the first driving cylinder 21 may be connected with the driving part of the first clutch 55 described hereinafter to drive the first clutch 55 to engage or disengage. The piston of the second driving cylinder 25 may be connected with the driving part of the second clutch 51 described hereinafter to drive the second clutch 51 to engage or disengage. The piston of the third driving cylinder 29 may be connected with the driving part of the third clutch 50 described hereinafter to drive the third clutch 50 to engage or disengage.

The internal pump 5 is driven by the countershaft 53 described hereinafter, and the external pump 13 may be driven by an external pump motor M. The inlets of the internal pump 5 and the external pump 13 are in fluid communication with the oil container 1. According to an embodiment of the present disclosure, a first filter 2 is disposed between the oil container 1 and the inlets of the internal pump 5 and the external pump 13. According to an embodiment of the present disclosure, the outlets of the internal pump 5 and the external pump 13 may be connected with the first proportional valve 18, the second proportional valve 22 and the third proportional valve 26. And according to an embodiment of the present disclosure, a second filter 15 may be provided between the outlets of the internal pump 5 and the external pump 13 and the first, second and the third proportional valve 18, 22, 26. In some embodiments, the filtering precision of the second filter 15 is higher than that of the first filter 2, so that cleanliness of the hydraulic oil in the first proportional valve 18, the second proportional valve 22 and the third proportional valve 26 may be further improved.

According to an embodiment of the present disclosure, the hydraulic system may further comprise an accumulator 17 between the first and second check valves 8, 14 and the first to third proportional valves 18, 22, 26, and a main oil pressure sensor 16 for detecting the oil pressure in the main oil line L.

According to an embodiment of the present disclosure, the hydraulic system may further comprise a relief valve 12, which may he connected in parallel with the external pump 13 to overflow the hydraulic oil in the main oil line L to the oil container 1.

Figure 2:
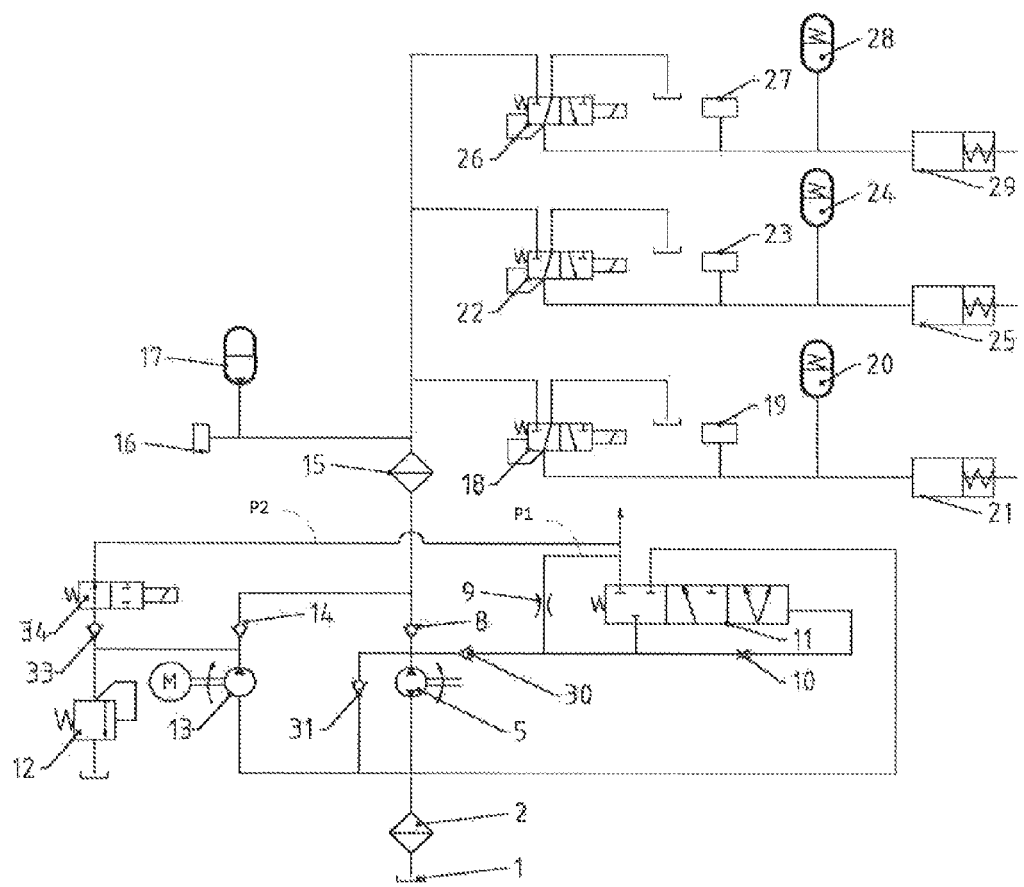
FIG. 2 is a schematic diagram illustrating a hydraulic system of an electric vehicle according to another embodiment of the present disclosure.

According to an embodiment of the present disclosure, as shown in FIG. 2, the first check valve 8 may be connected in series with the internal pump 5, the second check valve 14 may be connected in series with the external pump 13, and the first check valve 8 and the internal pump 5 may be connected in parallel with the second check valve 14 and the external pump 13 between the oil container 1 and the first to third proportional valves 18, 22 and 26.

The hydraulic system may further comprise a pressure regulating valve 11 connected in parallel with the internal pump 5 for supplying lubricating oils to the driving system such as respective gear pairs, bearings etc. contained therein. A fourth check valve 30 may be provided between the pressure regulating valve 11 and the outlet of the internal pump 5 to prevent back suction to the pressure regulating valve 11 when the internal pump 5 reverses its rotation. The pressure regulating valve 11 may be connected in series with a second damping orifice 10.

The hydraulic system may further comprise a first lubricating oil passage P1 for providing the lubricating oil to the driving system. An inlet of the first lubricating oil passage P1 may be connected between the fourth check valve 30 and the pressure regulating valve 11 and a first damping orifice 9 may be connected in series on the first lubricating oil passage P1. When the vehicle is started, the hydraulic oil may be supplied into the lubricating system via the first lubricating oil passage P1 to lubricate respective gear pairs and bearings in the transmission.

Further, the hydraulic system may further comprise a second lubricating oil passage P2 for providing lubricating oil for the driving system. An inlet of the second lubricating oil passage P2 may be in fluid communication with the outlet of the external pump 13, and a ninth check valve 33 and a first switch valve 34 may he connected in series on the second lubricating oil passage P2, When the vehicle is started, the hydraulic oil may be supplied into the lubricating system via the second lubricating oil passage P2 to lubricate respective gear pairs and bearings in the transmission.

According to an embodiment of the present disclosure, the internal pump 5 may be connected in parallel with the third check valve 31 for preventing sucking air when back suction is occurred in the internal pump 5, such as when the vehicle moves backward.

According to an embodiment of the present disclosure, as shown in FIG. 1, the hydraulic system may further comprise a bridge check valve unit. The bridge check valve unit may have a fifth check valve 3, a sixth check valve 4, a seventh check valve 6 and a eighth check valve 7. The fifth check valve 3 and the eighth check valve 7 may be connected in parallel with the sixth check valve 4 and the seventh check valve 6. And the bridge check valve unit may be connected between the oil container 1 and the first check valve 8, an oil port of the internal pump 5 may be connected between the fifth check valve 3 and the eighth check valve 7, another oil port of the internal pump 5 may be connected between the sixth check valve 4 and the seventh check valve 6. When the internal pump 5 rotates forward, the hydraulic oil in the oil container 1 may be supplied into the clutch driving circuits via the fifth check valve 3 and the seventh check valve 6. When the internal pump 5 rotates backward, the hydraulic oil in the oil container 1 may be supplied into the clutch driving circuits via the sixth check valve 4 and the eighth check valve 7. Or when the internal pump 5 rotates forward, the hydraulic oil in the oil container 1 may be supplied into the clutch driving circuits via the sixth check valve 4 and the eighth check valve 7, and when the internal pump 5 rotates backward, the hydraulic oil in the oil container 1 may be supplied into the clutch driving circuits via the fifth check valve 3 and the seventh check valve 6. That is, when the bridge cheek valve unit is adopted, whether the internal pump 5 rotates forward or backward, the hydraulic oil in the oil container 1 may he supplied into the clutch driving circuits. And the air suction may he avoided when the internal pump 5 rotates backward.

Further, the hydraulic system may further comprise a pressure regulating valve 11 connected in parallel with the bridge cheek valve unit for supplying lubricating oil for the driving system. Because there is no air suction, a check valve is not needed between the pressure regulating valve 11 and the first check valve 8.

In the following, a driving system of an electric vehicle be described in detail with reference to FIG. 4.

Figure 4:
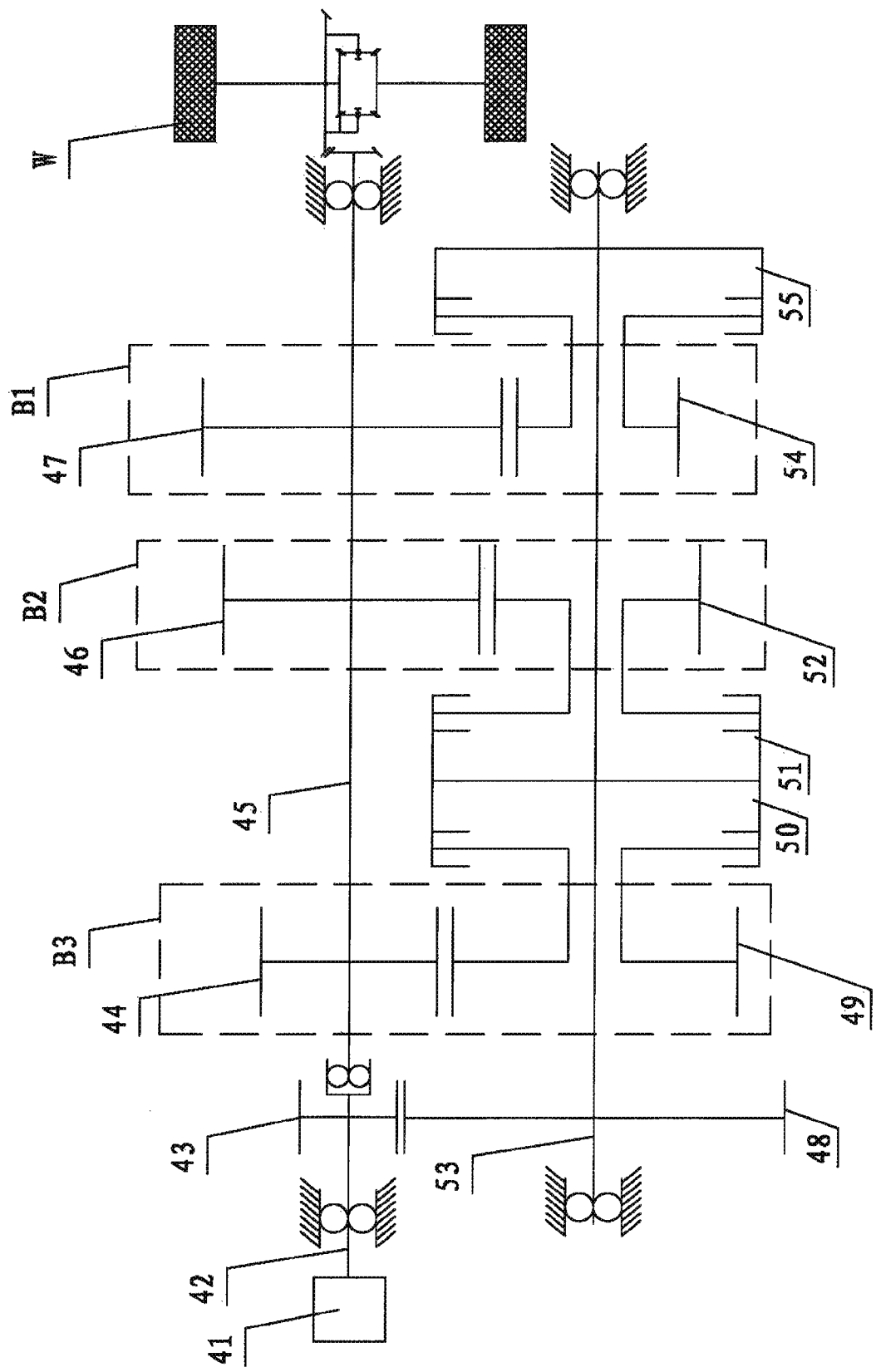
FIG. 4 is a schematic diagram illustrating a driving system of an electric vehicle.

As shown in FIG. 4, the driving system of the electric vehicle comprises a driving motor 41, a transmission and a hydraulic system.

Particularly, the transmission may have an input shaft 42, a countershaft 53, an output shaft 45, a first transmission unit B1, a first clutch 55, a second transmission unit B2 and a second clutch 51. According to an embodiment of the present disclosure, the driving motor 41 may be coupled to the input shaft 42 to drive the input shaft 42 to rotate. According to an embodiment of the present disclosure, the driving motor 41 may be connected or coupled to the input shaft 42 via a spline, as shown in FIG. 2. However, the present disclosure is not limited hereto. In another embodiment, the driving motor 41 may be directly coupled to the input shaft 42 in other manners. The electric vehicle using the driving system according to an embodiment of the present disclosure in which the driving motor 41 may be directly coupled to the input shaft 42 differs from the conventional vehicle adopting an engine in that there are no clutches and torque converters between the driving motor 41 and the input shaft 42, which may improve the power transmission efficiency and simplify the structure thereof.

The input shaft 42 is connected to the countershaft 53 to provide power from the driving motor 41 to the countershaft 53. According to an embodiment of the present disclosure, the input shaft 42 may be coupled to the countershaft 53 via a gear pair comprising a first gear 43 and a second gear 48. The first gear 43 may be disposed on the input shaft 42, the second gear 48 may he disposed on the countershaft 53, and the first gear 43 and the second gear 48 may be engaged with each other.

The first transmission unit B1 may be connected between the countershaft 53 and the output shaft 45 to transmit power between the countershaft 53 and the output shaft 45. The second transmission unit B2 may he connected between the countershaft 53 and the output shaft 45 to transmit power between the countershaft 53 and the output shaft 45.

The first clutch 55 may be disposed on the countershaft 53 and connected to the first transmission unit B1 for switching on or off the power transmission between the countershaft 53 and the first transmission unit B1. In other words, the first clutch 55 may be configured to link or cut off the power transmission between the countershaft 53 and the output shaft 45.

The second clutch 51 may be disposed on the countershaft 53 and connected or coupled to the second transmission unit B2 for switching on or off the power transmission between the countershaft 53 and the second transmission unit B2. In other words, the second clutch 51 may be configured to link or cut off the power transmission between the countershaft 53 and the output shaft 45. The first transmission unit B1 may have a first transmission ratio which is greater than a second transmission ratio of the second transmission unit B2.

The hydraulic system may be connected to the first dutch 55 to drive the first clutch 55 to engage or disengage, and the hydraulic system may be connected with the second clutch 51 to drive the second clutch 51 to engage or disengage.

With the driving system of the electric vehicle according to an embodiment of the present disclosure, the transmission may have the first transmission unit and the second transmission unit, and the first transmission ratio of the first transmission unit B1 may be larger than the second transmission ratio of the second transmission unit B2, which may appropriately match the torque and rotational speed characteristics of the driving motor to effectively improve the efficiencies of the driving motor under different driving conditions. Therefore, the energy may be saved, the driving range of vehicles may be increased, and the structure of the driving system may be simplified. More particularly, when the electric vehicle is running at a low speed, such as starting, climbing or accelerating, high output torque may be needed, and the hydraulic system may engage the first clutch 55. In other words, when the vehicle is switched to a first forward gear position, the power from the driving motor 41 may be transmitted to the input shaft 42, then the power may be transmitted from the input shaft 42 to the countershaft 53 via the first gear 43 and the second gear 48, then the power may be transmitted from the countershaft 53 to the output shaft 45 via the first clutch 55 and the first transmission unit B1, and finally the power may be transmitted from the output shaft 45 to the wheels W. Because the first transmission unit B1 has a larger transmission ratio, the torque transmitted to the wheels W is higher, thus meeting the requirement for high output torque during low speed. When the speed of the electric vehicle is increased, low output torque may be needed, and the hydraulic system may disengage the first clutch 55 and engage the second clutch 51. In other words, when the vehicle is switched to a second forward gear position, the power may be transmitted from the countershaft 53 to the output shaft 45 via the second clutch. 51 and the second transmission unit B2. Because the second transmission unit B2 has a lower transmission ratio, the torque transmitted to the wheels W may be decreased and the rotational speed of the wheels W may be increased, thus meeting the requirement for low output torque and high output rotational speed.

When the vehicle moves backward, the driving motor 41 may reversely rotate, and the hydraulic system may disengage the second clutch 51 and engage the first clutch 55. In other words, when the vehicle is switched to the reverse gear position, the power is transmitted to the wheels W via the first Clutch 55 and the first transmission unit B1. Because high output torque is needed for the reversing of the vehicle, it is better to engage the first clutch 55 to transmit power via the first transmission unit B1 having a higher transmission ratio.

As mentioned above, by selecting suitable transmission units, the torque and rotational speed characteristics of the driving motor 41 may be appropriately matched to effectively improve the efficiencies of the driving motor under different driving conditions, thus saving the energy and increasing the driving range of electric vehicles. Therefore, the electric vehicle may have characteristics similar to those of the conventional vehicle using an engine.

As described hereinabove, the driving system of the electric vehicle according to an embodiment of the present disclosure may have the first transmission unit B1 and the second transmission unit B2, that is to say, the vehicle may have two forward gear positions and one reverse gear position. It should be understood that, the present disclosure is not limited hereto. According to an embodiment of the present disclosure, the driving system may have suitable number of transmission units, such as three or four transmission units.

As shown in FIG. 4, according to an embodiment of the present disclosure, the transmission may further comprise a third transmission unit B3 and a third clutch 50. The third transmission unit B3 may be connected between the countershaft 53 and the output shaft 45 to transmit power between the countershaft 53 and the output shaft 45. The third clutch 50 may be disposed on the countershaft 53 and connected to third transmission unit B3 to switch on or off the power transmission between the countershaft 53 and the third transmission unit B3. In other words, the third clutch 50 may be configured to link or cut off the power transmission between the countershaft 53 and the output shaft 45. The hydraulic system may be connected to the third clutch 50 to engage or disengage the third clutch 50. The third transmission unit B3 may have a third transmission ratio. The second transmission ratio may be larger than the third transmission ratio.

For example, when the speed of the vehicle is further increased, the hydraulic system disengages the first clutch 55 and the second clutch 51, and engages the third clutch 50. In other words, the vehicle is switched to the third forward gear position, so that the power may he transmitted from the countershaft 53 to the output shaft 45 via the third transmission unit B3, Compared with the second transmission unit B2 and the first transmission unit B1, the third transmission unit B3 has a lower transmission ratio, the output torque is much lower, but the rotational speed is much higher. Therefore, when the speed of the vehicle is further increased, the power may be transmitted via the third clutch 50 and the third transmission unit B3, thus further improving the efficiency of the driving motor 41 and reducing the energy consumption.

In some embodiments, the first clutch 55, the second clutch 51 and the third clutch 50 each may be a wet clutch. As shown in FIG. 4, according to an embodiment of the present disclosure, the input shaft 42 and the output shaft 45 are coaxially deployed, and the axis of the countershaft 53 is in parallel with those of the input shaft 42 and the output shaft 45, which may reduce the size of the transmission. Therefore, the transmission may have a compact structure, thus saving space.

As shown in FIG. 4, according to an embodiment of the present disclosure, the second clutch 51 and the third clutch 50 may share the same driving part. Thus, the size of the transmission may be further reduced, simplifying the structure of the transmission and reducing the manufacturing cost thereof in the embodiment shown in FIG. 1 and FIG. 2, the first clutch 55 and the first transmission unit B1 are closest to the wheel W, the third clutch 50 and the third transmission unit B3 are furthest from the wheels W, and the second clutch 51 and the second transmission unit B2 may be disposed between the first clutch 55 and the third clutch 50. However, the present disclosure is not limited hereto. It should be understood by a person skilled in the art that, the first clutch 55, the second clutch 51 and the third clutch 50 may be arranged according to a specific application.

As shown in FIG. 4, according to an embodiment of the present disclosure, the first transmission unit B1 may comprise a third gear 54 disposed on the countershaft 53 and a fourth gear 47 disposed on the output shaft 45 and engaged with the third gear 54. The third gear 54 and the fourth gear 47 may be cylindrical gears. Therefore, the structure of the first transmission unit B1 is simple. The third gear 54 may be rotatably fitted over the countershaft 53, and the fourth gear 47 may be fixed to the output shaft 45. A driving part of the first clutch 55 may be fixed to the countershaft 53, and a driven part of the first clutch 55 may be connected to the third gear 54.

The second transmission unit B2 may comprise a fifth gear 52 disposed on the countershaft 53 and a sixth gear 46 disposed on the output shaft 45 and engaged with the fifth gear 52. The fifth gear 52 may be rotatably fitted over the countershaft 53, and the sixth gear 46 may be fixed to the output shaft 45. A driving part of the second clutch 51 may be fixed to the countershaft 53, and a driven part of the second clutch 51 may be connected to the fifth gear 52.

The third transmission unit B3 may comprise a seventh gear 49 disposed on the countershaft 53 and an eighth gear 44 disposed on the output shaft 45 and engaged with the seventh gear 49. The seventh gear 49 may be rotatably fitted over the countershaft 53, and the eighth gear 44 may be fixed to the output shaft 45. A driving part of the third clutch 50 may be fixed to the countershaft 53, and a driven part of the third clutch 50 may be connected to the seventh gear 49.

The operation of the hydraulic system in the driving system according to an embodiment of the present disclosure will be described below.

As shown in FIG. 1, after the hydraulic system is started, the internal pump 5 and/or the external pump 13 may absorb oil from the oil container 1 via the first filter 2. The hydraulic oil may flow into the main oil line L, then flow into one of the first clutch driving circuit L1, the second clutch driving circuit L2 and the third clutch driving circuit L3, i.e., driving one of the first hydraulic cylinder 21, the second hydraulic cylinder 25 and the third hydraulic cylinder 29.

The operation for driving the first hydraulic cylinder 21 will be described below. It may be understood that, the operation for driving the first hydraulic cylinder 21 may also be applied to the second clutch driving circuit L2 and the third clutch driving circuit L3. The piston of the first hydraulic cylinder 21 may compress a return spring under the hydraulic oil pressure to push the driving part and driven part of the first clutch 55 to engage with each other, so that the power may be transmitted from the countershaft 53 to the output shaft 45 via the first clutch 55 (that is, via the third gear 54 and the fourth gear 47) and finally may be transmitted to the wheels W. When the first clutch 55 is disengaged, the hydraulic oil may be in communication with the oil container 1, the oil pressure in the first hydraulic cylinder 21 may be decreased quickly, and the piston of the first hydraulic cylinder 21 may move quickly under the push of the return spring, so that the hydraulic oil may flow into the oil container 1. Therefore, the driving part and the driven part of the first clutch 55 may be disengaged from each other, thus cutting off the power transmission between the countershaft 53 and the output shaft 45.

With the driving system according to an embodiment of the present disclosure, generally, the internal pump 5 may be adopted to supply oil, the internal pump 5 may be driven by the countershaft 53, and the first check valve S may only allow the hydraulic oil to flow from the internal pump 5 into the first, second and third clutch driving circuits L1, L2 and L3, thus preventing the oil pressure in the hydraulic system from impacting the operation of the internal pump 5 and preventing the hydraulic oil in the hydraulic system from flowing backward.

According to an embodiment of the present disclosure, the third check valve 31 may only allow the hydraulic oil to flow from the oil container 1 toward the outlet side of the internal pump 5, thus preventing air suction during the back suction of the internal pump 5. For example, when the vehicle moves backward, the internal pump 5 may reversely rotate, and then the outlet of the internal pump 5 may absorb oil from the oil container 1 via the third check valve 31, thus avoiding damage to the internal pump 5. In other words, an oil loop may be formed between the third check valve 31 and the internal pump 5 to avoid the air suction of the internal pump 5.

The fourth check valve 30 may only allow the hydraulic oil to flow from the internal pump 5 toward the pressure regulating valve 11 to prevent the reverse flowing of the oil for lubricating.

As shown in FIG. 1, according to an embodiment of the present disclosure, when the bridge check valve unit is adopted, the hydraulic oil in the oil container 1 may flow into the clutch driving circuits via the bridge cheek valve unit regardless the forward rotating or reverse rotating of the internal pump 5.

According to an embodiment of the present disclosure, if the oil pressure in the internal pump 5 is too low, the external motor M may be started to drive the external pump 13 which supplies oil pressure to the main oil line L of the hydraulic system. The second check valve 14 may only allow the hydraulic oil to flow from the external pump 13 into the first, second and third clutch driving circuits L1, L2 and 13, to prevent the oil pressure in the hydraulic system from impacting the operation of the external pump 13 and the hydraulic oil in the hydraulic system from reversely flowing.

The internal pump 5 may supply the hydraulic oil when the hydraulic system lacks the hydraulic oil, and the remaining oil in the internal pump 5 may be used as the lubricating oil or flow into the oil container 1. By deployment of the accumulator 17, the external pump 13 may work intermittently, and as mentioned above, the relief valve 12 may relieve.

In the aforementioned hydraulic system, the pressure regulating valve 11 may supply the lubricating oil to the lubricating system of the vehicle.

According to an embodiment of the present disclosure, the hydraulic oil may be provided by the external pump 13 driven by the external motor M and the internal pump 5 driven by the countershaft 53. By disposing the external pump 13, before the electric vehicle is started, the external pump 13 may supply oil to the first clutch 55 to engage the first clutch 55, thus realizing the zero rotational speed starting, having no idle condition, reducing the energy consumption of the electric vehicle, and improving the utilization rate of the electric power.

As described above, the accumulator 17 may be used for storing energy, and the pressure regulating valve 11 may be used for regulating the pressure of the hydraulic oil. When the electric vehicle is static and the internal pump 5 is not running, the pressure regulating valve 11 is closed. When the electric vehicle is started, the amount of the hydraulic oil in the internal pump 5 is slowly increased. After the hydraulic oil is dampened by the first damping orifice 9 and the second damping orifice 10 and the possible slight leakage inside the pressure regulating valve 11 may be compensated, the pressure in the main oil line L may be increased in a short time. When the electric vehicle is running, after the pressure in the main oil line L is increased, the amount of the oil for lubricating is gradually supplied. After the pressure in the main oil line L is increased to a predetermined value, the hydraulic oil may flow into the inlet of the internal pump 5, thus reducing the work load of the first filter 2.

When the vehicle is running, the excessive energy may be stored in the accumulator 17. The stored energy may be utilized to perform the gear shifting operation so as to improve the efficiency of the transmission.

With the driving system of the electric vehicle according to an embodiment of the present disclosure, the first clutch 55, the second clutch 51 and the third clutch 50 are all controlled by the hydraulic system, and the first clutch 55 may he engaged before the vehicle is started, so that the idling of the driving motor 41 ma not exist after the vehicle is started. Only if the driving motor 41 starts to run, the power may be transmitted to the transmission, thus realizing the starting of zero rotational speed. As a result, the electric power loss may he reduced and the utilization rate of the electric power may he improved. Moreover, when the hydraulic oil supplied by the internal pump 5 is not enough, the external pump 13 may be used for supplying the hydraulic oil, thus improving the performance of the electric vehicle.

Therefore, with the driving system according to an embodiment of the present disclosure, the starting of zero rotational speed may be realized. According to the pedaling degree and vehicle velocity change, the gear position may be automatically switched, which may appropriately match the torque and rotational speed characteristics of the driving motor to effectively improve the efficiencies of the driving motor under different driving conditions. The efficiencies of the driving motor may be optimized under different driving conditions to reduce energy consumption and increase the driving range of the electric vehicle. For example, the driving system is especially suitable for an electric bus, which may need frequent acceleration, deceleration, parking and starting.

According to an embodiment of the present disclosure, an electric vehicle may be provided, comprising the driving system as described hereinabove.

The operation of the driving system according to an embodiment of the present disclosure will be described with reference to FIG. 4. In the following, the transmission in the driving system comprising the first, second and third transmission units B1, B2 and B3 will be described as an example, however, it would be appreciated by a person skilled in the art that, the transmission in the driving system according to an embodiment of the present disclosure may comprise more than three transmission units.

Firstly, the parking position of the driving system according to an embodiment of the present disclosure will be described with reference to FIG. 4. When the electric vehicle runs in a parking state, the driving part of the first clutch 55 is disengaged from the driven part thereof, the driving part of the second clutch 51 is disengaged from the driven part thereof, and the driving part of the third clutch 50 is disengaged from the driven part thereof, that is, the three clutches are all disengaged and the power transmission from the driving motor 41 to the output shaft 45 is cut off.

Then, the first forward gear of the driving system according to an embodiment of the present disclosure will be described with reference to FIG. 4. When the electric vehicle is in a starting state or is running at a low speed, a shifting control system may disengage the second clutch 51 and the third clutch 50 via a shifting mechanism, and engage the driving part and the driven part of the first clutch 55. Therefore, the power transmission line of the first forward gear is as follows: the driving motor 41→the input shaft 42→the first gear 43→the second gear 48→the countershaft 53→the first clutch 55→the third gear 54→the fourth gear 47→the output shaft 45. At this moment, the rotational speed of the driving motor 41 is lowest, the output torque is the highest, the transmission ratio is the highest, and the power transmitted to the wheels is the highest. The shifting control system and the shifting mechanism are known to a person skilled in the art, so that a detailed description thereof is omitted here for clarity purpose.

Then, the second forward gear of the driving system according to an embodiment of the present disclosure will be described with reference to FIG. 4. When the electric vehicle is running at an intermediate speed, the shifting control system may disengage the first clutch 55 and the third clutch 50 via the shifting mechanism, and engage the driving part and the driven part of the second clutch 51. For example, when the first forward gear is shifted to the second forward gear, the shifting control system may sense the current driving state of the electric vehicle via corresponding sensors, so that the running shift of the electric vehicle may he determined. When the first clutch 55 is disengaged, the second clutch 51 is engaged, so as to achieve the aim of shifting gears. The power transmission line of the second forward gear is as follows: the driving motor 41–the input shaft 42→the first gear 43→the second gear 48→the countershaft 53→the second clutch 51→the fifth gear 52→the sixth gear 46→the output gear 45. At this moment, the higher the transmission ratio, the lower the efficiency of the driving motor 41 is. And compared with the first forward gear, the transmission ratio of the second forward gear is lower, the efficiency of the driving motor 41 is higher, and the energy utilization rate is higher.

Then, the third forward gear of the driving system according to an embodiment of the present disclosure will he described with reference to FIG. 4. When the electric vehicle is running at a high speed, the shifting control system may disengage the first clutch 55 and the second clutch 51 via the shifting mechanism, and engage the driving part and the driven part of the third clutch 50. For example, when the second forward gear is shifted to the third forward gear, which is similar to that of the first forward gear being shifted to the second forward gear. When the second clutch 51 is disengaged, the third clutch 50 is engaged. The power transmission line of the third forward gear is the driving motor 41→the input shaft 42→the first gear 43→the second gear 48→the countershaft 53→the third clutch 50→the seventh gear 49→the eighth gear the output shaft 45. At the moment, the higher the transmission ratio, the lower the efficiency of the driving motor is. Therefore, compared with the first forward gear and the second forward gear, the transmission ratio of the third forward gear is lowest, and the energy utilization rate is highest.

Finally, the reversing of the driving system according to an embodiment of the present disclosure will be described with reference to FIG. 4. When the electric vehicle is reversed, the shifting control system may disengage the second clutch 51 and the third clutch 50 via the shifting mechanism, and engage the driving part and the driven part of the first clutch 55. Certainly, the driving motor 41 may reversely rotate during the reversing of the electric vehicle. The power transmission line of the reverse gear is as follows: the driving motor 41→the input shaft 42→the first gear 43→the second gear 48→the countershaft 53→the first clutch 55→the third gear 54→the fourth gear 47→the output gear 45.

According to embodiments of the present disclosure, the driving system of the electric vehicle may comprise at least two transmission units, which may meet various complicated driving conditions for the vehicle. Therefore, the energy may be saved, and the driving system of the electric vehicle may have simplified structure.

In aforementioned embodiments, the transmission may provide three forward gears and a reverse gear, which may not only meet the requirement for high output torque when the vehicle is starting or climbing, but also meet the requirement for maximum output speed when the vehicle is running on a smooth road. The output torque needs to be quite high when the vehicle is started, climbing or accelerating. Therefore, the gear of the transmission may be shifted to a low-speed gear, that is, the first forward gear or the second forward gear. Because the transmission ratio in the low speed gear is quite high, the torque transmitted to the wheels is quite high. When the electric vehicle is running at a high speed on the smooth road, the gear of the transmission may be shifted to a high speed gear, that is, for example in this embodiment, the third forward gear. At that moment, the transmission ratio of the transmission is quite low so that the torque transmitted to the wheels is low, but the rotational speed of the wheels may be increased to maximum. Meanwhile, the gear shifting may be appropriately controlled by the shifting control system, the torque and rotational speed characteristics of the driving motor may be matched ideally, and the efficiencies of the driving motor under different driving conditions may be optimized, thus saving the energy and increasing the driving range of the electric vehicles.

According to embodiments of the present disclosure, the three forward gears of the transmission may be mutually independent and the gear shifting may be realized by controlling the disengaging or engaging of the driving part and the driven part of each clutch. Furthermore, an operator may reasonably control the gear shifting via the shifting control system so as to avoid the power interruption during the gear shifting process. Therefore, the speed deceleration of the vehicle may not be perceived during gear shifting. Compared with the conventional automotive transmission, the structure of the transmission in the driving system according to an embodiment of the present disclosure is simplified.

In addition, the second clutch and the third clutch share the same driving part, so that the transmission may have a compact structure to save the installing space. Moreover, because the input shaft and the output shaft are coaxial, a parallel coaxial structure with simple structure may achieve the function of a conventional transmission with complicated structure comprising a rotation shaft (for example, a planetary gear), so that the driving system of the electric vehicle according to an embodiment of the present disclosure may be more compact in structure and lower in cost.

According to an embodiment of the present disclosure, the internal pump may he connected in parallel with the external pump, the hydraulic system may be ensured to work normally when any one of the internal pump and the external pump is damaged, so that the electric vehicle may read, a maintenance station for repairing under the low-speed shift.

Due to the adoption of the external pump, it is not necessary to provide a neutral position in the transmission, thus simplifying the structure thereof, saving space, lowering energy consumption, and the sustaining mileage of the electric vehicle may be extended accordingly.

In the hydraulic system, the pressure regulating valve may bypass oil, so that the hydraulic system may be divided into the power control hydraulic system and the lubricating hydraulic system for lubricating respective gear pairs etc. Meanwhile, the pressure regulating valve may function as a safety valve for achieving a more stable and reliable hydraulic system.

When the second filter, such as a fine filter, is added in front of the accumulator, the oil desired for the clutch may be ensured when the first shift position is shifted to the second shift position after the first oil flushing, and the accumulator is slowly filled with oil from the low speed to the high speed. And at the moment of gear shifting, most of the oil supplied to the clutch is the one in the accumulator after filtering, thus reducing the filtering area of the second filter and, accordingly, reducing the volume of the second filter.

According to a driving system and an electric vehicle of some embodiments of the present disclosure, before the electric vehicle is started, the external pump in the driving system may drive the first clutch to achieve the first forward gear, and then control the starting of the driving motor to achieve the zero rotational speed starting of the electric vehicle.

Although explanatory embodiments have been shown and described, it would be appreciated by those skilled in the art that changes, alternatives, and modifications can be made in the embodiments without departing from spirit and principles of the disclosure. Such changes, alternatives, and modifications all fall into the scope of the claims and their equivalents.

What is claimed is:

1. A hydraulic system for a vehicle, comprising:
an oil container;
a first and a second clutch driving circuits connected in parallel;
an internal pump with an inlet in fluid communication with the oil container and an outlet in fluid communication with the first and second clutch driving circuits;
a first check valve connected in series with the internal pump;
an external pump with an inlet in fluid communication with the oil container and an outlet in fluid communication with the first and second clutch driving circuits;
a second check valve connected in series with the external pump, wherein the first check valve and the internal pump are connected in parallel with the second check valve and the external pump between the oil container and the first and second clutch driving circuits;
a third check valve connected in parallel with the internal pump;
a pressure regulating valve connected in parallel with the internal pump for providing lubricating oil to the driving system; and
a fourth check valve connected between the pressure regulating valve and the outlet of the internal pump.

2. The hydraulic system of claim 1, further comprising a first lubricating oil passage for providing the lubricating oil to the driving system, wherein the first lubricating oil passage includes an inlet and a first damping orifice, the inlet being disposed between the fourth check valve and the pressure regulating valve.

3. The hydraulic system of claim 2, further comprising a second lubricating oil passage for providing lubricating oil for the driving system, wherein the second lubricating oil passage includes an inlet in in fluid communication with the outlet of the external pump, and the second lubricating oil passage includes a ninth check valve and a first switch valve connected in series.

4. The hydraulic system of claim 1, further comprising:
a first filter connected between the oil container and the inlets of the internal pump and the external pump; and
a second filter connected between the first and second check valves and the first and second driving circuits.

5. The hydraulic system of claim 1, further comprising a relief valve which is connected in parallel with the external pump.

6. The hydraulic system of claim 1, further comprising an accumulator connected between the first and second check valves and the first and second clutch driving circuits.

7. The hydraulic system of claim 1, further comprising a bridge check valve unit having a fifth check valve, a sixth check valve, a seventh check valve and an eighth check valve, wherein the fifth check valve and the eighth check valve are connected in parallel with the sixth check valve and the seventh check valve, the bridge check valve unit is connected between the oil container and the first check valve, an oil port of the internal pump is connected between the fifth check valve and the eighth check valve, another oil port of the internal pump is connected between the sixth check valve and the seventh check valve.

8. The hydraulic system of claim 7, further comprising a pressure regulating valve connected in parallel with the bridge check valve unit for providing the lubricating oil to the driving system.

9. The hydraulic system of claim 4, further comprising a third clutch driving circuit connected in parallel with the first and second clutch driving circuits.

10. The hydraulic system of claim 9, wherein:
the first clutch driving circuit comprises:
a first driving hydraulic cylinder with a piston connected with a driving part of a first clutch in the driving system; and
a first proportional valve connected with the first driving hydraulic cylinder and the oil container respectively;
the second clutch driving circuit comprises:
a second driving hydraulic cylinder with a piston connected with a driving part of a second clutch in the driving system; and
a second proportional valve connected with the second driving hydraulic cylinder and the oil container;
and
the third clutch driving circuit comprises:
a third driving hydraulic cylinder with a piston connected with a driving part of a third clutch in the driving system; and
a third proportional valve connected with the third driving hydraulic cylinder and the oil container.

11. The hydraulic system of claim 9, wherein:
the first clutch driving circuit comprises:
a first driving hydraulic cylinder having a piston connected with a driving part of a first clutch in the driving system; and
a second switch valve via which the first driving hydraulic cylinder is connected with the second filter;
a third switch valve via which the first driving hydraulic cylinder is connected with the oil container;
the second clutch driving circuit comprises:
a second driving hydraulic cylinder having a piston connected with a driving part of a second clutch in the driving system;
a fourth switch valve via which the second driving hydraulic cylinder is connected with the second filter; and
a fifth switch valve via which the second driving hydraulic cylinder is connected with the oil container; and
the third clutch driving circuit comprises:
a third driving hydraulic cylinder having a piston connected with a driving part of a third clutch in the driving system;
a sixth switch valve via which the third driving hydraulic cylinder is connected with the second filter; and
a seventh switch valve via which the third driving hydraulic cylinder is connected with the oil container.

12. The hydraulic system of claim 10, wherein the first clutch driving circuit further comprises a first buffer connected at an oil inlet of the first driving hydraulic cylinder;
the second clutch driving circuit further comprises a second buffer connected at an oil inlet of the second driving hydraulic cylinder; and
the third clutch driving circuit further comprises a third buffer connected at an oil inlet of the third driving hydraulic cylinder.

13. A driving system of an electric vehicle, comprising:
a driving motor;
a transmission having: an input shaft, a countershaft, an output shaft, a first transmission unit, a first clutch, a second transmission unit and a second clutch, wherein the driving motor is connected to the input shaft, the input shaft is connected to the countershaft to supply power from the driving motor to the countershaft, the first transmission unit is connected between the countershaft and the output shaft to transmit power between the countershaft and the output shaft, the second transmission unit is connected between the countershaft and the output shaft to transmit power between the countershaft and the output shaft, the first clutch is disposed on the countershaft and connected with the first transmission unit for linking or cutting off the power transmission between the countershaft and the first transmission unit, the second clutch is disposed on the countershaft and connected with the second transmission unit for linking or cutting off the power transmission between the countershaft and the second transmission unit, and the first transmission ratio of the first transmission unit is larger than the second transmission ratio of the second transmission unit; and
a hydraulic system comprising:

an oil container;

a first and a second clutch driving circuits connected in parallel;

an internal pump with an inlet in fluid communication with the oil container and an outlet in fluid communication with the first and second clutch driving circuits;

a first check valve connected in series with the internal pump;

an external pump with an inlet in fluid communication with the oil container and an outlet in fluid communication with the first and second clutch driving circuits; and a second check valve connected in series with the external pump, wherein the first check valve and the internal pump are connected in parallel with the second check valve and the external pump between the oil container and the first and second clutch driving circuits, wherein the internal pump is driven by the countershaft, and the first clutch driving circuit is connected with the first clutch to engage or disengage the first clutch, the second clutch driving circuit is connected with the second clutch to engage or disengage the second clutch.

14. The driving system of claim 13, wherein a first gear is disposed on the input shaft, a second gear engaged with the first gear is disposed on the countershaft, and the input shaft is connected with the countershaft via the first gear and the second gear.

15. The driving system of claim 13, wherein the first transmission unit comprises a third gear disposed on the countershaft and a fourth gear disposed on the output shaft and engaged with the third gear, the third gear is rotatably fitted over the countershaft, and the fourth gear is fixed to the output shaft, and a driving part of the first clutch is fixed to the countershaft, and a driven part of the first clutch is connected with the third gear.

16. The driving system of claim 13, wherein the transmission further comprises:

a third transmission unit disposed between the countershaft and the output shaft to transmit power between the countershaft and the output shaft; and a third clutch disposed on the countershaft and connected with the third transmission unit for linking or cutting off the power transmission between the countershaft and the third transmission unit, wherein the hydraulic system is connected with the third clutch to engage or disengage the third clutch, the third transmission has a third transmission ratio not larger than the second transmission ratio.

17. The driving system of claim 16, wherein the third transmission unit comprises:

a seventh gear disposed on the countershaft; and an eighth gear disposed on the output shaft and engaged with the seventh gear, wherein the seventh gear is rotatably fitted over the countershaft, the eighth gear is fixed to the output shaft, a driving part of the third clutch is fixed to the countershaft, and a driven part of the third clutch is connected with the seventh gear.

18. The driving system of claim 16, wherein the second clutch and the third clutch share the same driving part.

* * * * *